US010042420B2

(12) United States Patent
McLean (10) Patent No.: US 10,042,420 B2
(45) Date of Patent: *Aug. 7, 2018

(54) GAZE-AWARE CONTROL OF MULTI-SCREEN EXPERIENCE

(71) Applicant: International Business Machines Corporation, Armonk, NY (US)

(72) Inventor: James G. McLean, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,102

(22) Filed: Nov. 2, 2015

(65) Prior Publication Data
US 2017/0097678 A1    Apr. 6, 2017

Related U.S. Application Data

(63) Continuation of application No. 14/875,170, filed on Oct. 5, 2015.

(51) Int. Cl.
*G09G 5/00* (2006.01)
*G06F 3/01* (2006.01)
(Continued)

(52) U.S. Cl.
CPC ............ *G06F 3/013* (2013.01); *G06F 3/0484* (2013.01); *G06F 3/1423* (2013.01); *G06F 3/165* (2013.01); *G09G 5/12* (2013.01)

(58) Field of Classification Search
CPC ...... G06F 3/013; G06F 3/0484; G06F 3/1423; G06F 3/165; G09G 5/12
(Continued)

(56) References Cited

U.S. PATENT DOCUMENTS 7,331,929 B2   2/2008 Morita et al.
7,460,150 B1   12/2008 Coughlan et al.
(Continued)

FOREIGN PATENT DOCUMENTS

| EP | 2599303 A2 | 6/2013 |
| WO | 2006009972 A1 | 1/2006 |
| WO | 2013033842 A1 | 3/2013 |

OTHER PUBLICATIONS

Dostal et al., "Subtle Gaze-Dependent Techniques for Visualising Display Changes in Multi-Display Environments", Proceedings of the 18th ACM International Conference on Intelligent User Interfaces (IUI 2013), Mar. 19-22, 2013, Santa Monica, CA, USA, pp. 137-147. <http://pokristensson.com/pubs/DostalEtAllUI2013.pdf>.

(Continued)

*Primary Examiner* — Nicholas Lee
*Assistant Examiner* — Ngan T Pham Lu
(74) *Attorney, Agent, or Firm* — Patterson + Sheridan, LLP (57) ABSTRACT

Methods comprising outputting a first content on a first device and a second content on a second device, wherein the first and second devices are communicably coupled as part of a multi-device platform, wherein the first and second content are related content, monitoring, by a gaze detection module, a gaze of a first user holding the first device, and upon determining that the gaze of the first user is focused on one of the first device and the second device, performing a predefined operation to modify the first and second contents outputted on the first and second devices based on the gaze of the first user.

7 Claims, 4 Drawing Sheets

(51) Int. Cl.
  *G06F 3/14* (2006.01)
  *G06F 3/16* (2006.01)
  *G06F 3/0484* (2013.01)
  *G09G 5/12* (2006.01)

(58) Field of Classification Search
  USPC .......................................................... 345/156
  See application file for complete search history.

(56) References Cited

U.S. PATENT DOCUMENTS

| | | | |
|---|---|---|---|
| 7,899,915 | B2 | 3/2011 | Reisman |
| 2006/0037038 | A1 | 2/2006 | Buck |
| 2010/0220975 | A1* | 9/2010 | Kondo .................. G06F 3/013 386/350 |
| 2013/0083025 | A1* | 4/2013 | Gibson ................ G06F 3/1438 345/428 |
| 2013/0135198 | A1* | 5/2013 | Hodge ................... G06F 3/013 345/156 |
| 2013/0222271 | A1 | 8/2013 | Alberth et al. |
| 2013/0328925 | A1* | 12/2013 | Latta ...................... G09G 3/003 345/633 |
| 2014/0253437 | A1* | 9/2014 | Vaught ................ G02B 27/017 345/156 |
| 2014/0316543 | A1* | 10/2014 | Sharma .................. H04L 67/10 700/94 |
| 2015/0220295 | A1* | 8/2015 | Kim ..................... G06F 3/1415 345/156 |

OTHER PUBLICATIONS

Yuxiao Hu, "User Attention Tracking in Large Display Face Tracking and Pose Estimation", Media Computing Group Microsoft Research, Asia, pp. 1-9.
Paul Sawyers, "Vobile launches TVSync API platform for developers to build powerful second-screen apps", Aug. 15, 2012, retrieved Mar. 10, 2015, 9 pages. <http://thenextweb.com/media/2012/08/15/vobile-launches-tvsync-api-platform-developers-build-powerful-second-screen-apps/>.
Samsung Galaxy S4 Smartphone, "smart pause" feature, 22 pages, retrieved Mar. 10, 2015. <http://www.samsung.com/latin_en/consumer/mobile-phones/mobile-phones/smartphone/GT-I9500ZKLTPA?>.
Eyetracking, Inc., EyeTracking Blog—EyeWorks: Multi-Display Data Collection, retrieved Mar. 10, 2015, 3 pages. <http://www.eyetracking.com/News/EyeTracking-Blog/EntryId/47/EyeWorks-Multi-Display-Data-Collection>.
Aakash Jain, Apple Inc. "LookAway Player", retrieved Mar. 10, 2015, 3 pages. <https://itunes.apple.com/us/app/lookaway-player/id626136961>.
IBM "List of IBM Patents or Patent Applications Treated As Related".
U.S. Appl. No. 14/875,170, entitled Gaze Aware Control of Multi-Screen Experience, filed Oct. 5, 2015.

* cited by examiner

GAZE-AWARE CONTROL OF MULTI-SCREEN EXPERIENCE

CROSS-REFERENCE TO RELATED APPLICATIONS

This application is a continuation of co-pending U.S. patent application Ser. No. 14/875,170, filed Oct. 5, 2015. The aforementioned related patent application is herein incorporated by reference in its entirety.

BACKGROUND

The present invention relates to multi-screen platforms, and more specifically, to providing gaze-aware control of multi-screen platforms.

Television, movie, and gaming experiences are moving towards dual-screen or multi-screen (or multi-device) models. For example, a user may watch a sporting event on a television while tracking statistics of the sporting event on a tablet computer. Similarly, a video game may provide a main screen viewable by all local players as well as handheld devices personal to each user. However, a problem with such multi-screen applications is that the user cannot focus on each screen at the same time. This may cause the user to miss content on one screen while focusing on another screen.

SUMMARY

Embodiments disclosed herein include methods comprising outputting a first content on a first device and a second content on a second device, wherein the first and second content are related content, wherein the first and second devices are communicably coupled as part of a multi-device platform, monitoring, by a gaze detection module, a gaze of a first user holding the first device, and upon determining that the gaze of the first user is focused on one of the first device and the second device, performing a predefined operation to modify the first and second contents outputted on the first and second devices based on the gaze of the first user.

DETAILED DESCRIPTION

Embodiments disclosed herein provide techniques to dynamically tailor content displayed on each screen in a multi-screen (or multi-device) environment based on the user's current gaze, or focus. For example, if eye-tracking technologies determine that the user is focusing on a handheld device, embodiments disclosed herein may pause (or loop) assistive information being displayed on a second device, such as a main display or television. Similarly, embodiments disclosed herein may overlay the assistive information from the main display to the handheld device the user is focusing on. Generally, embodiments disclosed herein may perform any type of predefined operation to adjust the content displayed on any number of screens based on the user's gaze.

Figure 1:
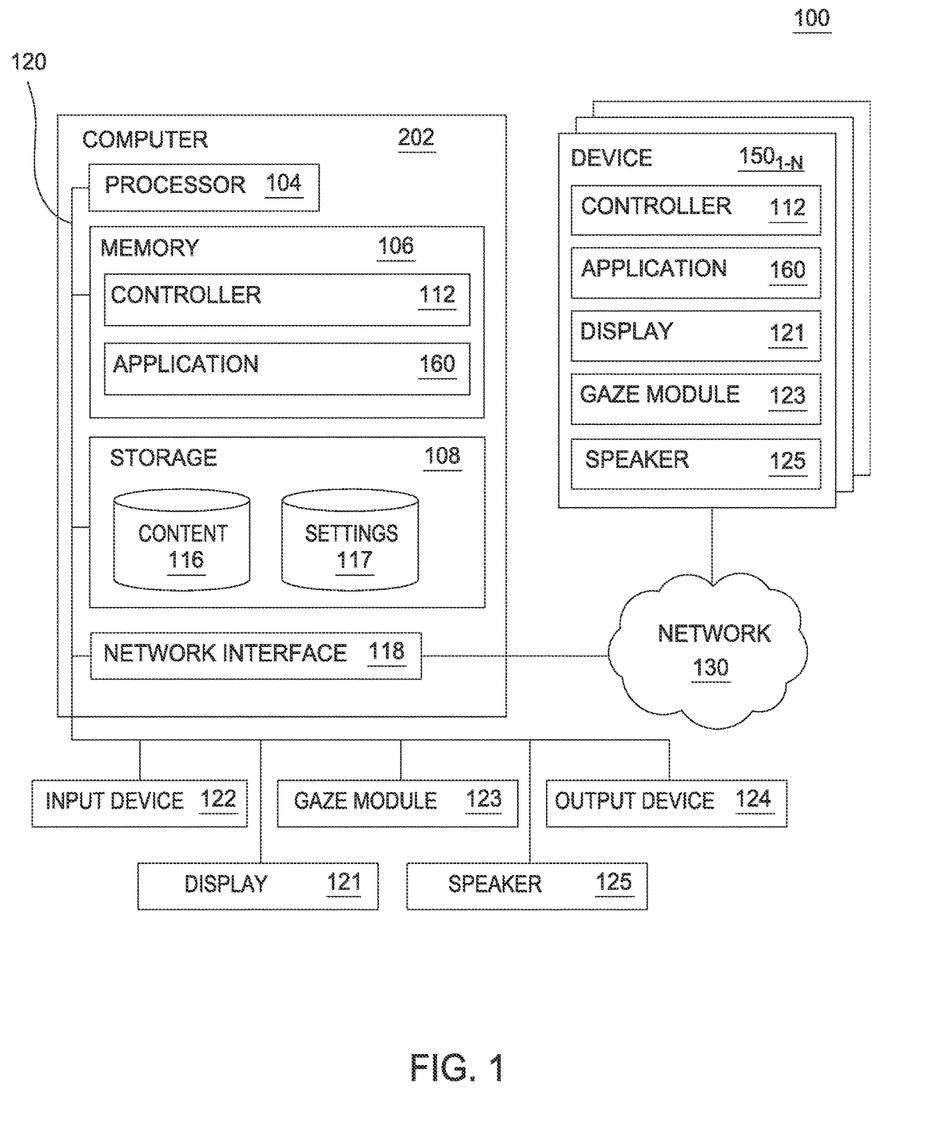
FIG. 1 illustrates a system which provides gaze-aware control of a multi-screen experience, according to one embodiment.

FIG. 1 illustrates a system 100 which provides gaze-aware control of a multi-screen experience, according to one embodiment. The networked system 100 includes a computer 102. The computer 102 may also be connected to other computers via a network 130. In general, the network 130 may be a telecommunications network, a local area network (LAN), and/or a wide area network (WAN). In a particular embodiment, the network 130 is the Internet. As shown, the computer 102 is connected to a plurality of devices $150_{1-N}$ through the network 130. In at least one embodiment, the system 100 is part of a multi-display (or multi-device) environment. One example of a multi-display environment is a video game system where a plurality of user devices 150 interact with a common controller (in one embodiment, the computer 102), such as the Wii U® by Nintendo®. Another example of a multi-display environment includes, without limitation, a configuration where user devices 150, such as tablets, smartphones, or laptops operate in conjunction with a main display (such as the display 121 of the computer 102), where the user devices 150 display supplemental or companion content to television, movies, or other multimedia content.

The computer 102 generally includes a processor 104 which obtains instructions and data via a bus 120 from a memory 106 and/or a storage 108. The computer 102 may also include one or more network interface devices 118, input devices 122, and output devices 124 connected to the bus 120. The computer 102 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 104 is a programmable logic device that performs instruction, logic, and mathematical processing, and may be representative of one or more CPUs. The network interface device 118 may be any type of network communications device allowing the computer 102 to communicate with other computers via the network 130.

The storage 108 is representative of hard-disk drives, solid state drives, flash memory devices, optical media and the like. Generally, the storage 108 stores application programs and data for use by the computer 102. In addition, the memory 106 and the storage 108 may be considered to include memory physically located elsewhere; for example, on another computer coupled to the computer 102 via the bus 120.

The display 121 may be any display device such as televisions, monitors, touch screen displays, and so on. The input device 122 may be any device for providing input to the computer 102. For example, a keyboard and/or a mouse may be used. The input device 122 represents a wide variety of input devices, including keyboards, mice, controllers, and so on. Furthermore, the input device 122 may include a set of buttons, switches or other physical device mechanisms for controlling the computer 102. The output device 124 may include output devices such as vibrotactile arrays, and so on. The speaker 125 may be any type of hardware speaker configured to output sounds.

The gaze module 123 is generally configured to detect the focus of a user's gaze. The gaze module 123 may be implemented as any type of hardware capable of determining the focus of a user's eyes. For example, the gaze module 123 may be implemented using cameras, lasers, or any optical scanning technology. In one embodiment, the gaze module 123 includes sensors that calculate the angle of refraction of ultraviolet (UV) or infrared (IR) light off of a user's eyes. If the angle of refraction is greater than a specified threshold (or the light is not refracted at all), the gaze module 123 may determine that the user's gaze is not focused on the computer 102 (or a device 150) including a gaze module 123. In another embodiment, the gaze module 123 may analyze captured images to determine where the user is looking at (based, for example, on an expected location of the user's iris), or to determine if a user is present in the image.

As shown, the memory 106 includes an application 160. Generally, the application 160 may be any application configured to output information in a multi-device environment. For example, the application 160 may be a video game, web browser, or any application where content is outputted on a plurality of different devices. As shown, the memory 106 contains the controller 112, which is configured to provide gaze-aware control of multi-display (or device) platforms. Generally, the controller 112 may receive data from the gaze modules 123 of the system 100 to determine which display 121 in the multi-display environment the user is looking at. The controller 112 may then trigger modification of the content outputted by the applications 160 in the multi-display environment based on which device the user is looking at (or is the focus of the user's gaze). For example, if the gaze module 123 on a device $150_1$ determines that a user's gaze is focused on the device $150_1$, the controller 112 may perform a predefined operation to modify the output of an application 160 executing on the device $150_1$. The predefined operation may include, without limitation, outputting information currently being outputted on the display 121 of the computer 102 on the display 121 of the device $150_1$; outputting, through the speaker 125 of the device $150_1$, an audible cue to look at helpful information being displayed on the display 121 of the computer 102; outputting supplemental or additional content on the device $150_1$, and the like. In addition, the controller 112 executing on the computer 102 may perform a predefined operation to modify the content outputted by the application 160 on the computer 102. For example, if the gaze module 123 of the computer 102 indicates no users are looking at the display 121 of the computer 102 (the main display), the controller 112 may pause a tutorial (or other important information) outputted by the application 160 until at least one user begins looking at the display 121 of the computer 102. Similarly, the controller 112 may loop the tutorial on the display 112 of the computer 102. Generally, the distributed nature of the controller 112 allows the controller 112 to perform a predefined operation to modify any type of content outputted by the application 160 on any of the computer 102 and/or the devices $150_{1-N}$. Although shown as being separate applications, in at least one embodiment, the functionality of the controller 112 is provided by each application 160. In at least one embodiment, instances of the controller 112 may communicate to share information such as data from the gaze module 123, contextual data describing the output of an application 160 on a given device, and the like.

As shown, the storage 108 includes the content 116 and the settings 117. The content 116 may include any type of information that the application 160 and/or controller 112 may output on the computer and/or a device 150. The content 116 may be any type of content, such as sounds, images, animations, games, video, text, and the like. The settings 117 include parameters controlling the operation of the controller 112. For example, the settings 117 may include time thresholds (for example, a time threshold to determine where a user's gaze is focused), user profiles with historical gaze data, a set of predefined operations to modify content outputted by the application 160, and the like. The thresholds may vary from user to user and/or device to device. Similarly, a threshold amount of time required to determine a change in focus/gaze may be defined.

As shown, the devices $150_{1-N}$ also execute instances of the controller 112 and 160. The devices $150_{1-N}$ also include a respective display 121, gaze module 123, and speaker 125. The devices $150_{1-N}$ may be any type of device, such as handheld gaming units, tablet computers, laptop computers, desktop computers, smart phones, and the like. The devices $150_{1-N}$ may also include the content 116 and the settings 117 (not pictured).

Therefore, the networked system 100 is configured to provide gaze-aware control of a multi-device environment. The instances of the controller 112 and/or application 160 may communicate to facilitate the gaze-aware controls described herein. Example operations that may be performed by the controller 112 may include, without limitation, pausing output of an instance of the application 160 when a user is not viewing the respective display 121; tailoring a sound mix common of the application 160 to the display 121 the user is focusing on; changing the sound mix to account for information not being viewed on other displays (therefore providing audio information in lieu of visual information being missed on other displays); modifying the content outputted on a display when no users are viewing that display; modifying the content outputted on a first device based on an analysis of the content outputted on a second device (where the user is focused on the second device); and moving content from a first device that is not being focused on to a second device that is being focused on (such as by using overlays, picture-in-picture, or sub-pictures on a display).

Figure 2:
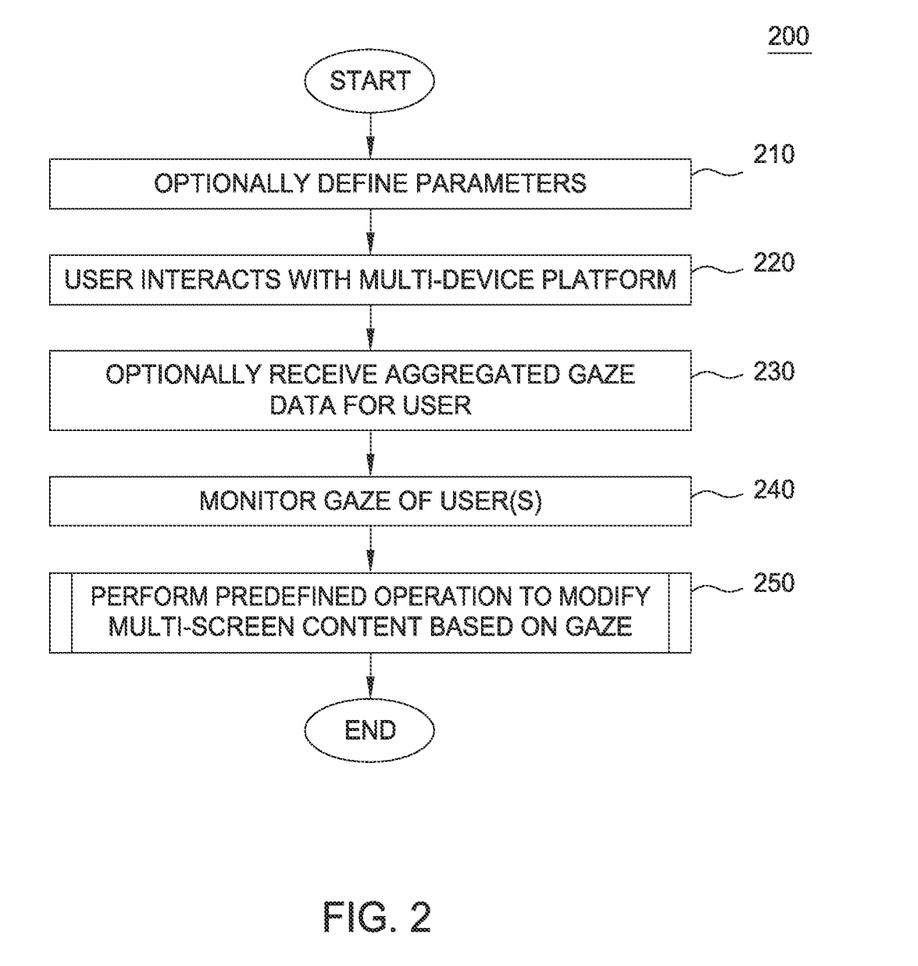
FIG. 2 illustrates a method to provide gaze-aware control of a multi-screen experience, according to one embodiment.

FIG. 2 illustrates a method 200 to provide gaze-aware control of a multi-screen experience, according to one embodiment. Generally, the steps of the method 200 tailor content outputted on one or more devices in a multi-device computing environment. The method begins at step 210, where system parameters are defined. The parameters may include any of the settings 117, such as time thresholds for determining if a user is focusing on a given computing device (or display coupled thereto), predefined operations to modify content, user-specific rules and operations, arbitration schemes for determining gaze or focus (such as when multiple users are present), and the like. At step 220, at least one user may interact with a multi-device platform. For example, the user may play a video game that outputs content on a main display (such as the computer 102) as well as a handheld device 150 held by the user.

At step 230, the controller 112 may receive aggregated gaze data from the settings 117 for the user (if such data exists in a user profile for the user). The gaze data may specify how often the user views the primary display and/or the secondary displays in a multi-display environment. The user profile may also specify any events (or predefined operations) known to cause the user to switch gaze from one display to another. Doing so may allow the controller 112 to provide content modifications that are tailored to cause the user to change their focus/gaze to a specific device. For example, if the controller 112 determines, from the user's profile, that audio tones cause the user to switch their focus from the secondary device to a main device, the controller 112 may output the audio tones when the user may be missing critical information being outputted by the main device.

At step 240, the controller 112 and/or the gaze modules 123 may monitor the gaze (or focus) of users. As shown in FIG. 1, the computer 102 and the devices 150 each have a gaze module 123 that is configured to determine the gaze of one or more users. Each gaze module 123 may therefore provide indications to the controller 112 specifying whether a user's gaze is focused on the respective computing device. In addition, the controller 112 may store the data collected by the gaze module 123 to user profiles in the settings 117 for future use. At step 250, described in greater detail with reference to FIG. 3, the controller 112 may perform a predefined operation to modify the content outputted by one or more devices in the multi-device environment based on the monitored gaze. In at least one embodiment, the controller 112 may perform the predefined operations upon determining that the user's gaze has been focused on the same device for an amount of time that exceeds a predefined threshold in the settings 117.

For example, at step 240, the controller 112 of a main display device may receive an indication from the controller 112 of a first user device 150 indicating that the user is looking at the first user device 150 (based on data provided by the gaze module 123 of the first user device 150). For example, an application 160 executing on the main display device may display a live sporting event, while secondary user devices 150 (including the first user device) output statistics, replays, or other additional information. Upon determining the user is gazing at the first user device 150, the controller 112 at step 250 may pause the sporting event on the main display until the user focuses their attention to the main display. Similarly, the instances of the controller 112 may shift the footage of the sporting event so that the first user display 150 is outputting the video of the live sporting event. As another example, if the user is using the first user device 150 to view statistics for player X, the instances of the controllers 112 may operate to shift the video of the sporting event on the main display to focus on player X (or select a video feed that is displaying player X).

Figure 3:
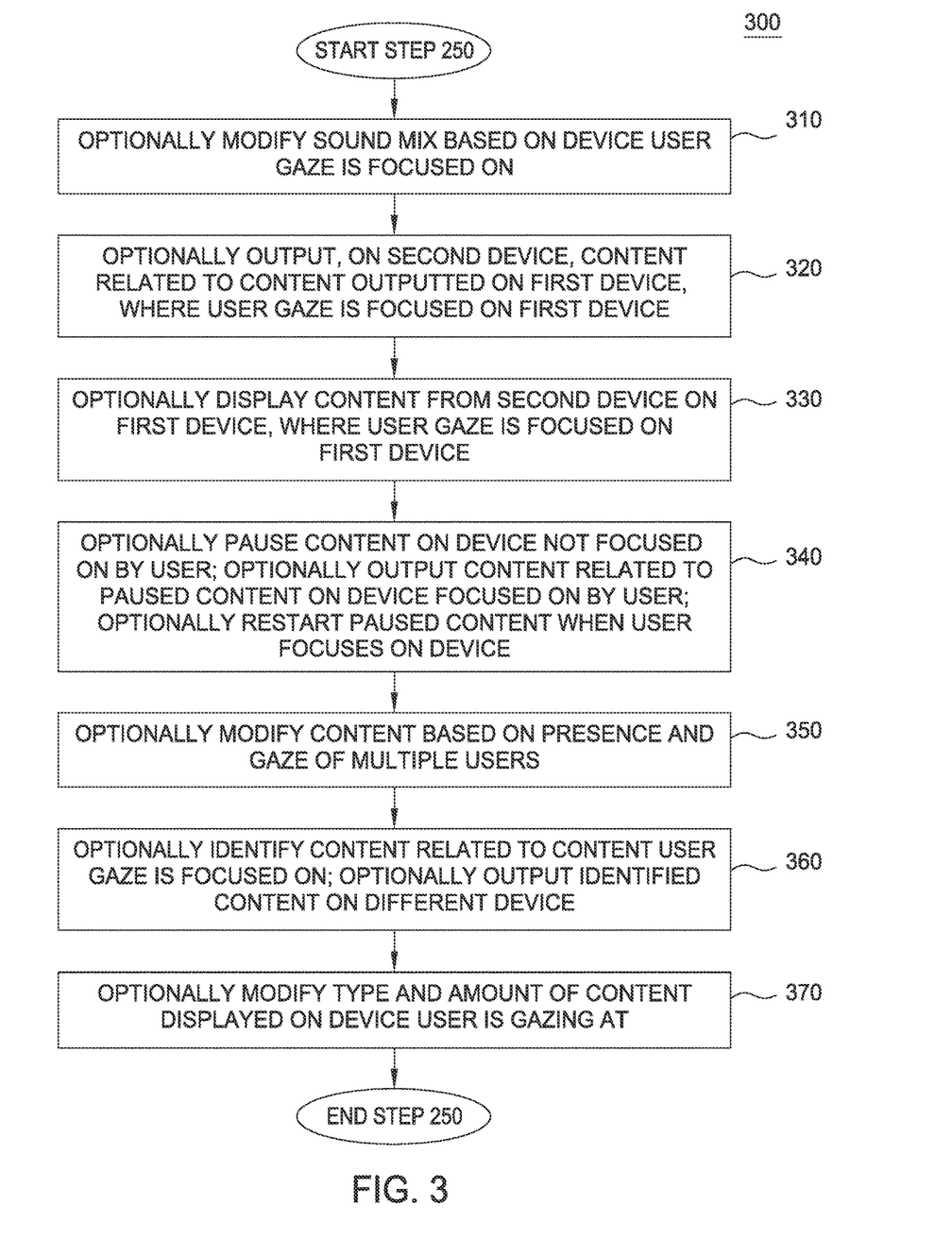
FIG. 3 illustrates a method to perform a predefined operation to provide gaze-aware control of a multi-screen experience, according to one embodiment.

FIG. 3 illustrates a method 300 corresponding to step 250 to perform a predefined operation to provide gaze-aware control of a multi-screen experience, according to one embodiment. Generally, the steps of the method 300 include example operations that the controller 112 may initiate based on the gaze of users. As appropriate, the controller 112 may initiate any number or combination of the steps of the method 300. At step 310, the controller 112 may cause an application 160 to modify a common sound mix based on the device a user's gaze is focused on. For example, multiple devices may be used to display a live sporting event, where a first device is the "main screen" displaying the sporting event, users may have a respective secondary device. In such a scenario, the user's secondary device may be used to provide an isolated view of a particular player while the main screen provides the overall view. When the controller 112 determines that the user is focusing on the secondary screen, the controller 112 may include the sound from the isolated view of the player (such as a microphone worn by the player) in the overall mix of sound for the multi-screen application 160.

At step 320, the controller 112 may optionally output, on a second device, content related to content being outputted on a first device, where the user is focusing on the first device. Continuing with the sporting event example, if the controller 112 determines that the user is focused on a specific player on the main screen, the controller 112 may cause detailed information (such as biographical information, statistics, and the like) about the player to be displayed on the second device. As another example, if the user is using the second device to view statistics or scores, the controller 112 may display the statistics or scores on the first device if the user has not accessed this information for an amount of time exceeding a predefined threshold. At step 330, the controller 112 may determine that the user is focusing on a first device, and optionally display content from a second device on the first device. For example, continuing with the live sporting event scenario, the first device may be used to display the main view of the sporting event, while the user is looking at statistics on a secondary device. In such a scenario, the controller 112 may overlay the statistics on the main screen.

At step 340, the controller 112 may pause content outputted by a device when no users are focused on the device. In at least one embodiment, the controller 112 may output content related to the paused content on a second device that the controller 112 has determined that at least one user is gazing at. In addition, in at least one embodiment, the controller 112 may optionally restart the paused content when at least one user focuses their gaze on a device displaying the paused content. At step 350, the controller 112 may optionally modify content based on the presence of multiple users. For example, if the controller 112 determines that more than one person is watching a sporting event or playing a video game, the controller may present the same information on all screens (although possibly in different forms) to prevent one viewer from missing key information because another viewer is looking at a different screen.

At step 360, the controller may optionally identify content related to content the user is currently focused on, and output the identified content on a different device. For example, if the controller 112 determines that a user is looking at a weather map in the top left corner of a main display, the controller 112 may identify a full weather forecast, and display the full weather forecast on the user's handheld device. At step 370, the controller 112 may optionally modify the type of content and/or the amount of content displayed on a device that the user is gazing at. More generally, the controller 112 may scale the amount of information provided on a given device based on the amount of time a user spends looking at that device. For example, a user who seldom glances at their secondary display (which may be determined based on historical data for the user in the settings 117) may receive less information via the second display relative to a user who frequently glances at their own secondary display.

Figure 4:
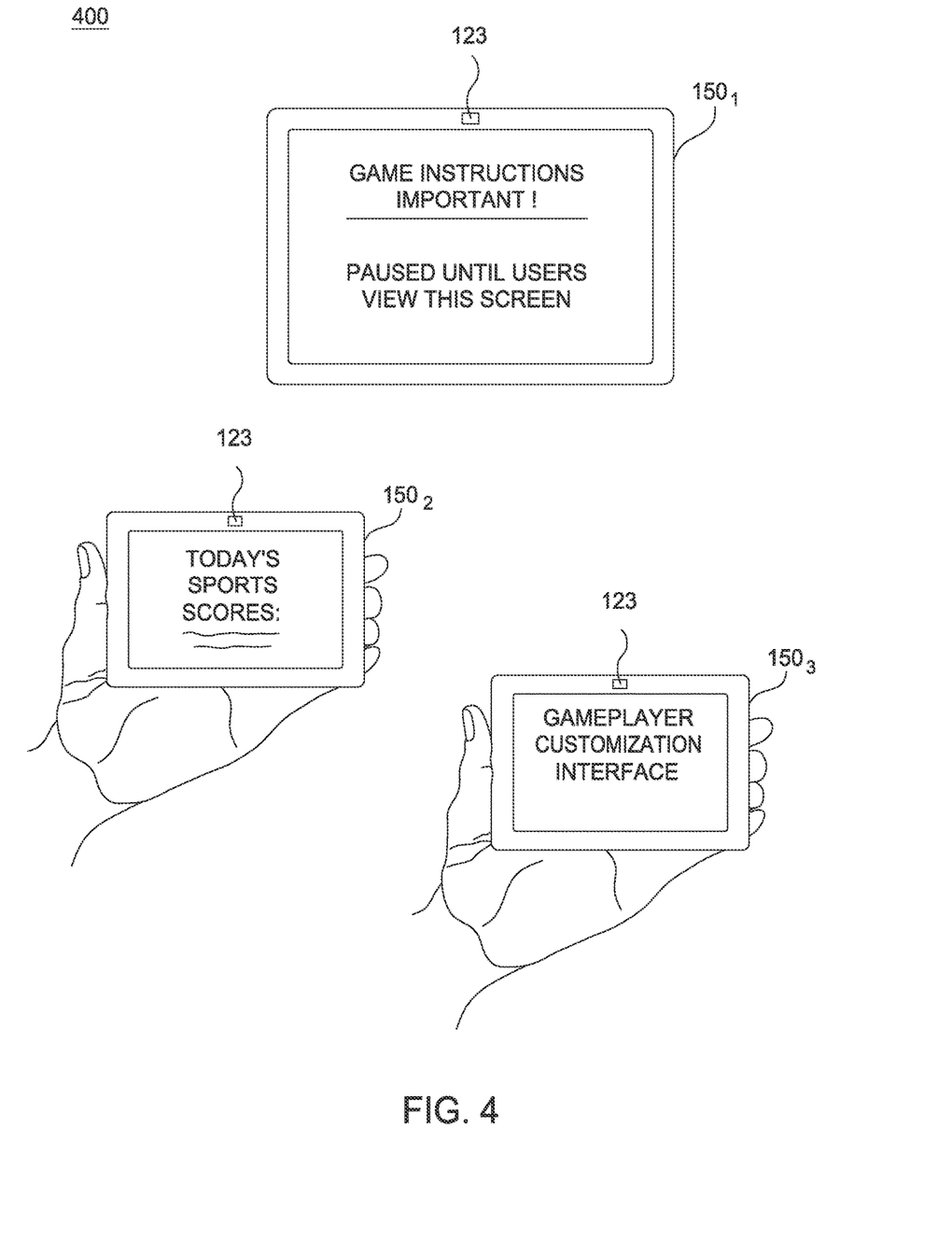
FIG. 4 is a schematic illustrating example devices configured to perform gaze-aware control of a multi-screen experience, according to one embodiment.

FIG. 4 is a schematic 400 illustrating example devices configured to perform gaze-aware control of a multi-screen experience, according to one embodiment. As shown, FIG. 4 includes a main display device $150_1$ and two secondary display devices $150_{2,3}$, which are communicably coupled as part of a multi-screen experience in that each of the devices 150 executes the controller 112 and includes a respective gaze module 123. As shown, the main display $150_1$ is currently displaying content that includes a set of instructions on how to play a video game. However, the controller 160 of the main display 150₁ has paused the instructions upon determining that the gaze of the users of secondary devices 150₂,₃ is not focused on the gaze module 123 of the main display 150₁. Instead, as shown, device 150₂ is displaying today's sports scores (content unrelated to the video game displayed on device 150₁), while device 150₃ is displaying a game player customization component of the video game (related content). When the controller 160 of each device 150₂,₃ determines that the gaze of the users holding the devices is directed at the respective device 150, the controllers 160 may send an indication to the controller 160 of the main display 150₁. The received indication specifying that the users are not viewing the main display 150₁ allows the controller 160 of the main display 150₁ to pause the content (or send the video game instructions to the secondary devices 150₂,₃) to ensure the users view the instructions.

Advantageously, embodiments disclosed herein provide gaze-aware content in multi-display environments. By identifying which device a user is looking at, embodiments disclosed herein may perform operations to modify the content outputted by the device. For example, the operation may output important information that is currently only being displayed on a different device, to ensure that the user gets the important information. Similarly, embodiments disclosed herein may perform operations to modify content outputted by devices that are not the focus of any user. For example, the operation may pause or loop a tutorial on a main screen until the user's focus shifts to the main screen, ensuring that the user views the tutorial (or other important information). Generally, embodiments disclosed herein may perform any operation to modify the content outputted by any number of devices in the multi-display device environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the controller 112 could execute on a computing system in the cloud and provide gaze-aware control of a multi-screen environment. In such a case, the controller 112 could monitor user gaze (or focus) and store the gaze data for each user at a storage location in the cloud. [Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:
outputting a first content on a first device and a second content on a second device, wherein the first and second devices are communicably coupled as part of a multi-device platform, wherein the first and second contents are related;
monitoring, by the gaze tracking module, a gaze of a first user holding the first device;
upon determining that the gaze of the first user is focused on the first device:
identifying, in a profile of the first user, a first output event previously determined to cause the first user to change the focus of the gaze from the first device to the second device, wherein the first output event comprises at least one of an audio output event and a visual output event outputted by at least one of the first and second devices;
pausing display of the second visual portion on the second device; and
modifying, based on the gaze of the first user and the identified first output event, at least one of a first audio portion and a first visual portion of the first content outputted by the first device to include the identified first output event, wherein the first audio portion is of a plurality of audio portions of the first content outputted on the first device; and upon determining that the gaze of the first user is focused on the second device:

resuming display of the second visual portion on the second device; and modifying at least one of a second audio portion and a second visual portion of the second content outputted on the second device based on the gaze of the first user, wherein the second audio portion is of a plurality of audio portions of the second content outputted on the second device.

2. The method of claim 1, wherein the first and second contents are distinct components of the related content, wherein a type of the first and second contents comprise a video game executing on the first and second devices, wherein the related content comprises a common sound mix including the second audio portion of the second content and not the first audio portion of the first content, wherein the method further comprises:

modifying the common sound mix to include the first and second audio portions; and outputting the modified common sound mix by the first and second devices.

3. The method of claim 1, wherein modifying at least one of the first audio portion and the first video portion of the first content comprises adding the second audio portion of the second content to the plurality of audio portions of the first content, wherein the method further comprises:

outputting: (i) the first audio portion and the first visual portion of the first content, and (ii) the second audio portion and the second visual portion of the second content on the first device;

determining that the gaze of the user is focused on a first visual component of the first visual portion of the first content; and outputting the first visual component of the first visual portion of the first content on the second device.

4. The method of claim 1, wherein modifying the first and second contents is further based on a respective type of the first and second contents, wherein method further comprises:

determining the gaze of the user remains focused on the second device;

determining the type of the second content;

identifying content related to the determined type of the second content, the related content being of the determined type of the second content; and outputting the identified related content on the first device.

5. The method of claim 1, wherein modifying the first and second contents is further based on the profile comprising historical gaze data of the first user, wherein the historical gaze data comprises: (i) a threshold amount of time defined by the first user for determining the gaze of the first user, (ii) a determined average amount of time the gaze of the first user is focused on the first device, and (iii) a determined average amount of time the gaze of the first user is focused on the second device, wherein the first output event is of a plurality of output events known to cause the first user to change the focus of the gaze between the first and second devices, wherein each output event comprises at least one of audio events and visual events outputted by at least one of the first and second devices, wherein first and second contents are modified upon determining an amount of time the gaze of the first user is focused on one of the first device and the second device exceeds the threshold amount of time defined by the first user, wherein the first and second contents are modified upon determining an amount of time the gaze of the first user is focused on one of the first device and the second device exceeds the threshold amount of time defined by the first user.

6. The method of claim 1, wherein a gaze of a second user is focused on the second device, wherein modifying the first and second contents is further based on the gaze of the second user being focused on the second device.

7. The method of claim 1, further comprising prior to outputting the first content on the first device and the second content on the second device:

determining that the gaze of the user is focused on the first device;

outputting the first output event on the second device;

determining that the gaze of the user changed from the first device to the second device within a threshold amount of time of outputting the first output event; and storing, in the user profile, an indication that the first output event caused the first user to change the gaze from the first device to the second device.

* * * * *